(12) United States Patent
Kawagishi et al.

(10) Patent No.: US 8,653,803 B2
(45) Date of Patent: Feb. 18, 2014

(54) VOLTAGE GENERATION CIRCUIT

(75) Inventors: Norihiro Kawagishi, Hamamatsu (JP); Nobuaki Tsuji, Hamamatsu (JP); Toshio Maejima, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 229 days.

(21) Appl. No.: 13/200,214

(22) Filed: Sep. 21, 2011

(65) Prior Publication Data

US 2012/0068675 A1   Mar. 22, 2012

(30) Foreign Application Priority Data

Sep. 22, 2010 (JP) ................................. 2010-211703

(51) Int. Cl.
  *G05F 1/565* (2006.01)
  *G05F 1/618* (2006.01)
(52) U.S. Cl.
  USPC .......................................... 323/284; 323/283
(58) Field of Classification Search
  USPC ............................ 323/282, 283, 284, 285, 288
  See application file for complete search history.

(56) References Cited

U.S. PATENT DOCUMENTS

| | | | | |
|---|---|---|---|---|
| 5,627,460 | A * | 5/1997 | Bazinet et al. ................. | 323/288 |
| 6,897,640 | B2 * | 5/2005 | Nebon et al. ................... | 323/282 |
| 7,176,663 | B2 | 2/2007 | Takimoto et al. | |
| 7,345,464 | B2 * | 3/2008 | Steele ............................ | 323/288 |
| 7,724,547 | B1 | 5/2010 | Zheng et al. | |
| 8,314,599 | B2 * | 11/2012 | Nagai ............................ | 323/285 |
| 2004/0218405 | A1 | 11/2004 | Yamada et al. | |
| 2005/0189931 | A1 | 9/2005 | Ishino | |
| 2005/0252546 | A1 | 11/2005 | Sasaki | |
| 2006/0290333 | A1 | 12/2006 | Fukushi et al. | |
| 2008/0174292 | A1 | 7/2008 | Nishida | |
| 2008/0224674 | A1 | 9/2008 | Hasegawa | |
| 2008/0284402 | A1 | 11/2008 | Ishino | |
| 2011/0018513 | A1 | 1/2011 | Noda | |

FOREIGN PATENT DOCUMENTS

| | | |
|---|---|---|
| CN | 1599971 A | 3/2005 |
| CN | 1627617 A | 6/2005 |
| CN | 1697282 A | 11/2005 |

(Continued)

OTHER PUBLICATIONS

Korean Intellectual Property Office, "Notice of Submission of Opinion" Patent Application No. 10-2011-0095183 of Yamaha Corporation; Mailing Date: Feb. 15, 2013: 4 pages.

Dong-Yun Lee, Hyeong-Ju Noh and Dong-Seok Hyun, "A New Sensorless Control Scheme Using Simple Duty Feedback Technique in DC/DC Converters" dated Dec. 6, 2002, pp. 554-562.

(Continued)

*Primary Examiner* — Gary L Laxton
(74) *Attorney, Agent, or Firm* — Pillsbury Winthrop Shaw Pittman LLP

(57) ABSTRACT

A voltage generation circuit includes a voltage detection circuit that generates a detection voltage according to an output voltage, a reference voltage generation circuit that generates a reference voltage which changes periodically, a comparison circuit that generates a control signal according to a result of a comparison between the detection voltage and the reference voltage, wherein control pulses each having a pulse width according to the detection voltage are sequentially appeared in the control signal, and a driving pulse generation circuit that generates a driving pulse corresponding to the control pulse and supplies the generated driving pulse to a transistor connected to a DC power source when the pulse width of the control pulse exceeds a predetermined width, and stops generating the driving pulse when the pulse width of the control pulse becomes smaller than the predetermined width.

5 Claims, 6 Drawing Sheets

(56) References Cited

FOREIGN PATENT DOCUMENTS

| | | |
|---|---|---|
| CN | 1885698 A | 12/2006 |
| JP | 2008236822 A | 10/2008 |
| KR | 10-0963310 | 6/2010 |
| WO | WO 2009/125860 A1 | 10/2009 |

OTHER PUBLICATIONS

The State Intellectual Property Office of the People's Republic of China, "Notification of First Office Action" Patent Application No. 201110291057.8 of Yamaha Corporation; Mailing Date: Aug. 1, 2013; 13 pages.

* cited by examiner

VOLTAGE GENERATION CIRCUIT

BACKGROUND

The present invention relates to a technique of generating a predetermined voltage.

There has been proposed a technique (DC-DC converter) that a predetermined voltage is generated under the control of a transistor connected to a DC power source and applied to a driving load. For example, JP-A-2008-236822 proposes a technique of switching a period for controlling the conductive/non-conductive state of a transistor between a low load state and a high load state. To be concrete, two kinds of clock signals, that is, a reference clock signal of a predetermined frequency and a control clock signal of a frequency variable according to a load are generated in parallel, whereby the transistor is controlled in accordance with the reference clock signal in the high load state but controlled in accordance with the control clock signal in the low load state. According to the above configuration, it is possible to reduce an amount of dissipation power in the low load state.

However, according to the technique described in JP-A-2008-236822, since it is necessary to independently provide two kinds of circuits for respectively generating the reference clock signal and the control clock signal, there arises a problem that the circuit configuration is complicated. Further, there arises a problem that the control operation of the transistor becomes discontinuous at the time of switching between the clock signals according to the load.

SUMMARY

In view of the aforesaid circumstances, an object of the invention is to reduce an amount of dissipation power in the low load state without requiring two kinds of signals and circuits.

In order to achieve the above object, according to the present invention, there is provided a voltage generation circuit for generating an output voltage by supplying a driving pulse to a transistor connected to a DC power source so as to be turned on, comprising:

a voltage detection circuit that generates a detection voltage according to the output voltage;

a reference voltage generation circuit that generates a reference voltage which changes periodically;

a comparison circuit that generates a control signal according to a result of a comparison between the detection voltage and the reference voltage, wherein control pulses each having a pulse width according to the detection voltage are sequentially appeared in the control signal; and a driving pulse generation circuit that generates the driving pulse corresponding to the control pulse and supplies the generated driving pulse to the transistor when the pulse width of the control pulse exceeds a predetermined width, and stops generating the driving pulse when the pulse width of the control pulse becomes smaller than the predetermined width.

Preferably, the driving pulse generation circuit includes a delay circuit which delays the control signal, a logical circuit which outputs as an output signal, a result of a negative AND operation between the control signal before the delay processing and the control signal after the delay processing, and a driving circuit which generates the driving pulse according to the output signal of the logical circuit.

Preferably, the driving circuit generates the driving pulse in which a front edge is defined according to the output signal of the logical circuit and a rear edge is defined according to the control signal after the delay processing by the delay circuit.

Preferably, a delay amount of the delay circuit is set to be variable.

Preferably, the driving pulse generation circuit includes a counting circuit which measures the pulse width of the control pulse, a comparator which generates an output signal according to a result of a comparison between the pulse width measured by the counting circuit and a reference value, and a driving circuit which generates the driving pulse according to the output signal output from the comparator.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

<A: First Embodiment>

Figure 1:
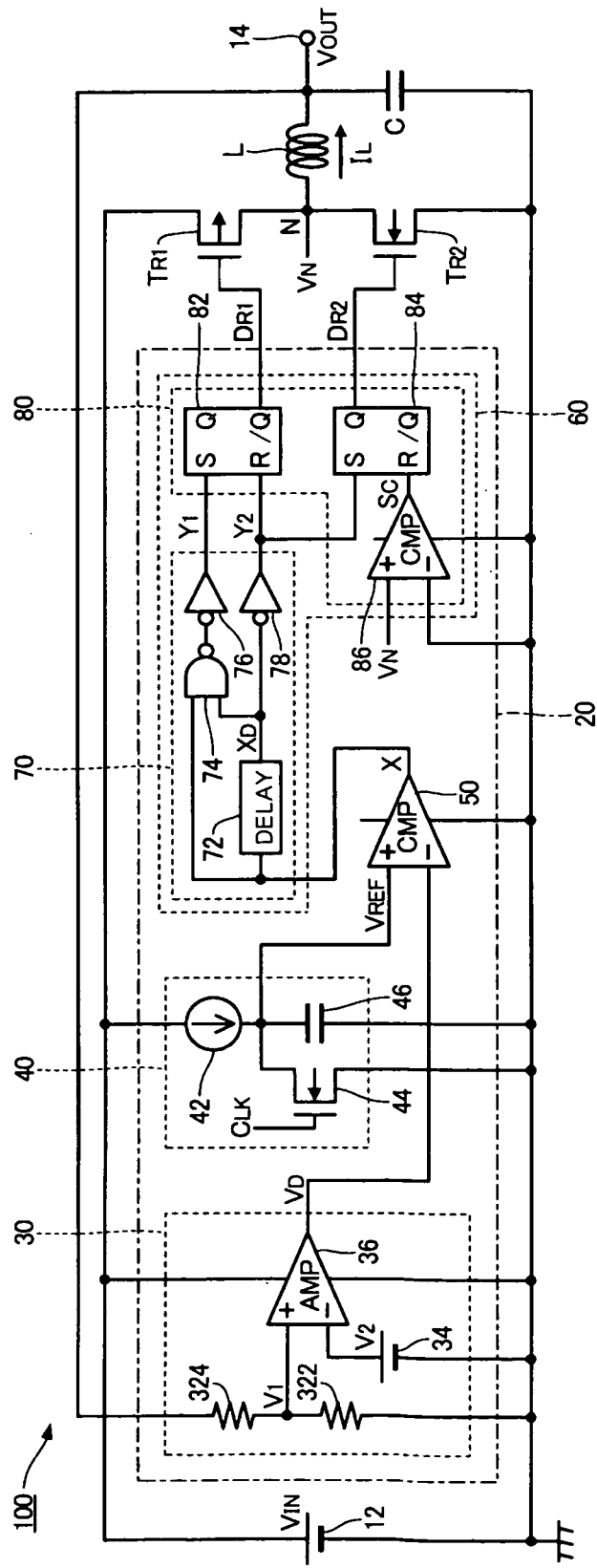
FIG. 1 is a block diagram showing a voltage generation circuit according to a first embodiment of the invention.

FIG. 1 is a block diagram showing a voltage generation circuit 100 according to the first embodiment of the invention. The voltage generation circuit 100 is a power source circuit (DC-DC converter) which generates an output voltage VOUT according to an input voltage VIN generated from a DC power source 12 and supplies the output voltage to an output terminal 14. The output terminal 14 is coupled to a driving load (not shown). As shown in FIG. 1, the voltage generation circuit 100 includes a P-channel transistor TR1, an N-channel transistor TR2, a choke coil L, a smoothing capacitor C and a control circuit 20.

The transistor TR1 and the transistor TR2 are coupled in series to the power source. To be concrete, a drain of the transistor TR1 and a drain of the transistor TR2 are coupled to mutually at a coupling point N. Further, a source of the transistor TR1 is supplied with the input voltage VIN and a source of the transistor TR2 is grounded. The choke coil L is disposed between the output terminal 14 (driving load) and the coupling point N between the transistor TR1 and the transistor TR2. The smoothing capacitor C is coupled to the output terminal 14 and smoothes the output voltage VOUT.

The control circuit 20 generates the output voltage VOUT at the output terminal 14 under the control of the transistor TR1 and the transistor TR2. To be concrete, the control circuit 20 supplies a driving signal DR1 to a gate of the transistor TR1 and also supplies a driving signal DR2 to a gate of the transistor TR2.

As shown in FIG. 1, the control circuit 20 includes a voltage detection circuit 30, a reference generation circuit 40, a comparison circuit 50 and a driving pulse generation circuit 60. Although the first embodiment exemplarily shows the configuration where the control circuit 20 is mounted on a single integrated circuit, the invention may employ the configuration where the respective elements of the control circuit 20 are mounted on a plurality of integrated circuits in a distributed manner.

The voltage detection circuit 30 generates a detection voltage VD according to the output voltage VOUT generated at the output terminal 14. As shown in FIG. 1, the voltage detection circuit 30 of the first embodiment includes a resistor element 322, a resistor element 324, a voltage source 34 and an amplifier (error amplifier 36). The resistor element 322 and the resistor element 324 divide the output voltage VOUT fed back from the output terminal 14 to generate a feedback voltage V1. The voltage source 34 is a DC power source for generating a predetermined comparison voltage V2 (for example, 1.2 volt). The feedback voltage V1 is supplied to the non-inverting input terminal of the amplifier 36 and the comparison voltage V2 is supplied to the inverting input terminal of the amplifier 36.

Figure 2:
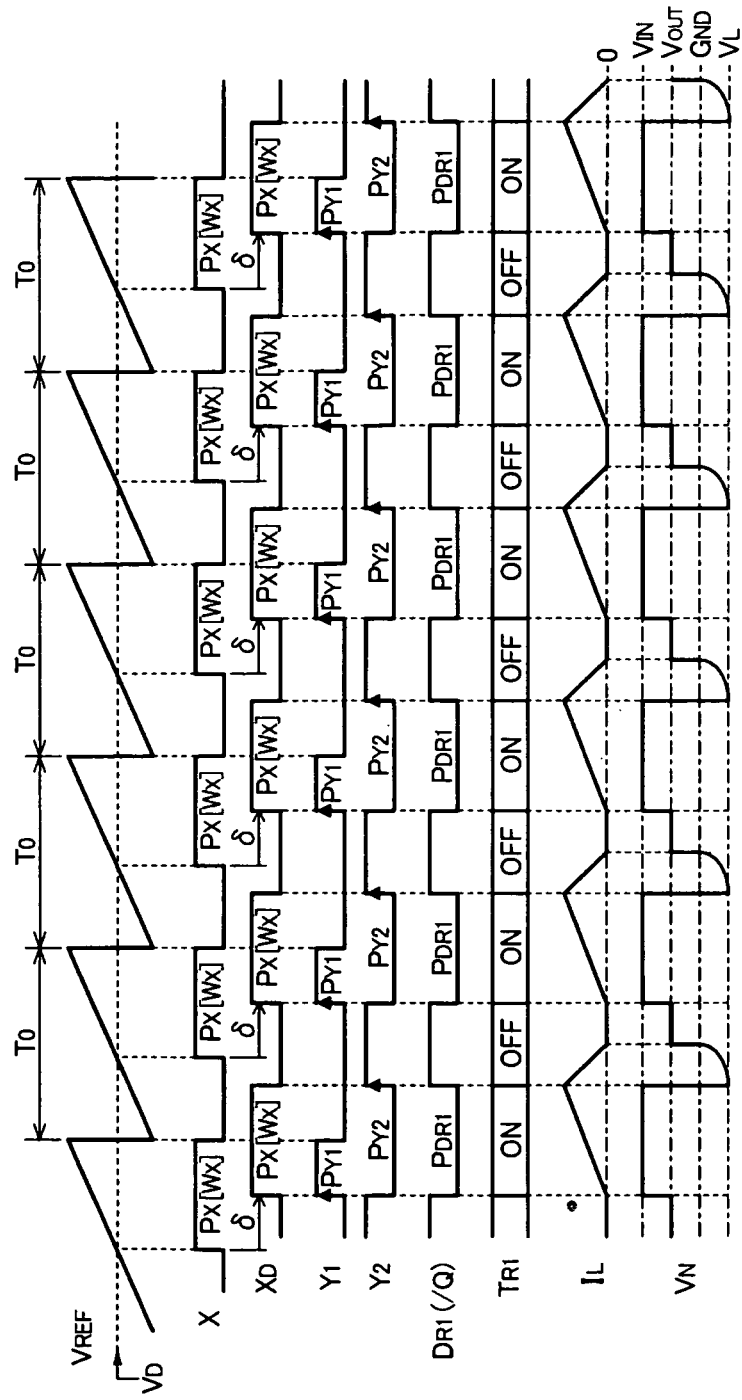
FIG. 2 is a waveform diagram of respective signals in a high load state.
Figure 3:
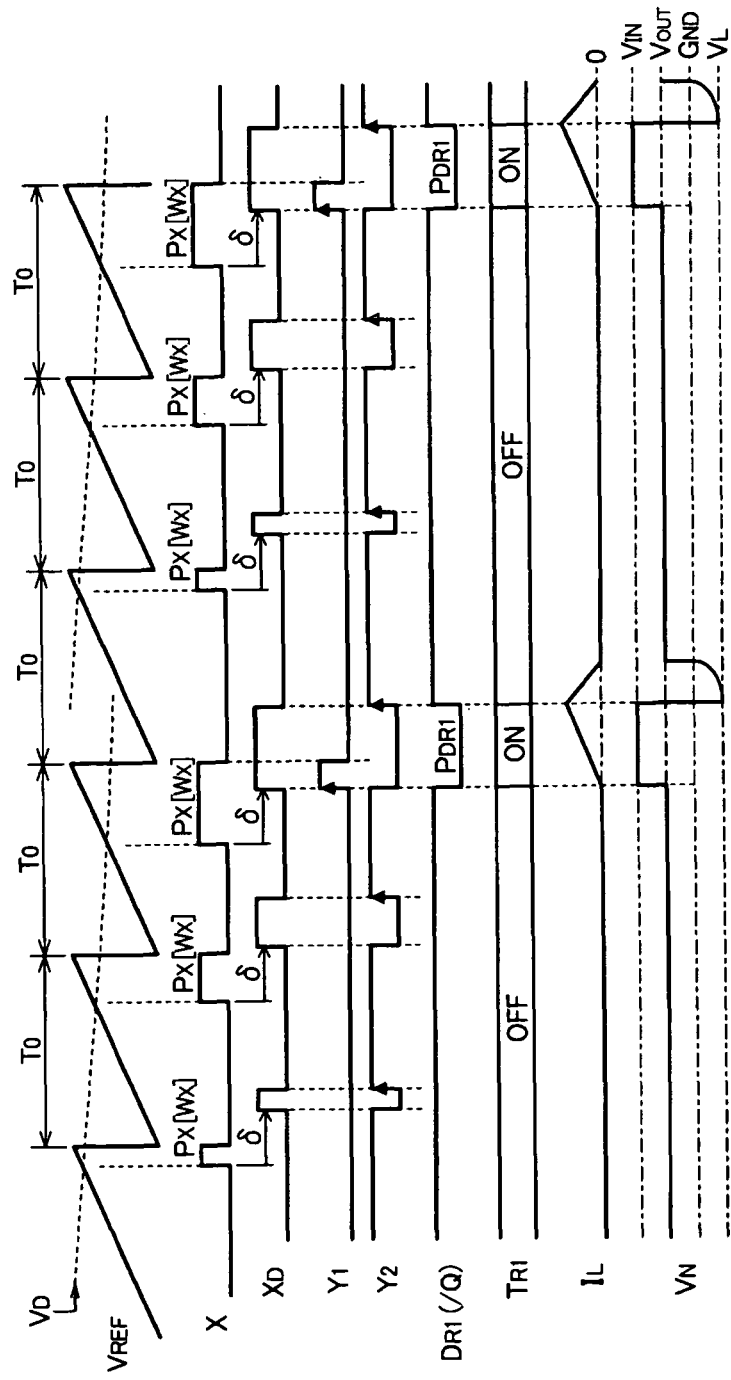
FIG. 3 is a waveform diagram of respective signals in a low load state.

The amplifier 36 generates the detection voltage VD which is obtained by amplifying a difference voltage between the feedback voltage V1 and the comparison voltage V2. To be concrete, the detection voltage VD becomes larger as the output voltage VOUT is higher than the comparison voltage V2, whilst the detection voltage VD becomes smaller as the output voltage VOUT is lower than the comparison voltage V2. Since the output voltage VOUT becomes smaller as the supply power to the driving load increases (in a higher load state), the detection voltage VD reduces according to the higher load state (the detection voltage VD increases according to a lower load state). FIG. 2 is a waveform diagram of respective signals in the high load state (the case where the detection voltage VD is low), and FIG. 3 is a waveform diagram of respective signals in the low load state (the case where the detection voltage VD is high).

The reference generation circuit 40 in FIG. 1 is an oscillation circuit for generating a reference voltage VREF which changes periodically and configured to include a current source circuit 42, a transistor 44 and a capacitor element 46. A voltage between the both ends of the capacitor element 46 is supplied to the comparison circuit 50 as the reference voltage VREF. The current source circuit 42 is a constant current source which generates a predetermined current and supplies to the capacitor element 46. The transistor 44 is a switch disposed between the both ends of the capacitor element 46. When a clock signal CLK having a unit period T0 as a single period is supplied to the gate of the transistor 44, the transistor simultaneously shifts to an ON state at the start point of the unit period T0 to thereby short-circuit between the both ends of the capacitor element 46. Thus, as shown in FIGS. 2 and 3, the reference voltage VREF of a triangular waveform or a sawtooth waveform is generated between the both ends of the capacitor element 46 in a manner that this reference voltage varies periodically at every unit period T0 as a single period so as to be initialized to zero at the start point of each of the respective unit periods T0 and increased within the unit period T0 with time The comparison circuit 50 is configured by an operational amplifier having an inverting input terminal and a non-inverting input terminal. The detection voltage VD generated by the voltage detection circuit 30 is supplied to the inverting input terminal of the comparison circuit 50 and the reference voltage VREF generated by the reference generation circuit 40 is supplied to the non-inverting input terminal of the comparison circuit 50. The comparison circuit 50 compares the detection voltage VD and the reference voltage VREF to thereby generate a control signal X according to the comparison result. To be concrete, as shown in FIGS. 2 and 3, the control signal X is set to a high level when the reference voltage VREF is higher than the detection voltage VD, whilst the control signal X is set to a low level when the reference voltage VREF is lower than the detection voltage VD. Thus, the control signal X is generated in a manner that a pulse (hereinafter called a "control pulse") PX is disposed at each unit period T0 corresponding to the period of the reference voltage VREF.

As described above, since the detection voltage VD becomes smaller according to the higher load state (the detection voltage VD becomes larger according to the lower load state), the pulse widths WX of the respective control pulses PX become longer as the load becomes larger (the pulse widths WX become shorter according to the lower load state). As will be understood from the aforesaid explanation, the comparison circuit 50 acts as a pulse width modulation circuit for generating the control signal X in which the pulses PX respectively having the pulse widths WX according to the detection voltages VD (output voltages VOUT) are disposed.

The driving pulse generation circuit 60 in FIG. 1 generates the driving signal DR1 and the driving signal DR2 by utilizing the control signal X supplied from the comparison circuit 50. As shown in FIG. 1, the driving pulse generation circuit 60 includes a short pulse removing circuit 70 and a driving circuit 80. The short pulse removing circuit 70 generates a control signal Y1 and a control signal Y2 from the control signal X generated from the comparison circuit 50, and the driving circuit 80 generates the driving signal DR1 and the driving signal DR2 from the control signal Y1 and the control signal Y2.

As shown in FIG. 1, the short pulse removing circuit 70 is configured by including a delay circuit 72, a logical circuit 74, an inverting circuit 76 and an inverting circuit 78. As shown in FIGS. 2 and 3, the delay circuit 72 generates a control signal XD which is obtained by delaying the control signal X generated by the comparison circuit 50 by a predetermined delay amount δ. The delay amount δ of the delay circuit 72 is set to be shorter than the unit period T0 (single period of the reference voltage VREF).

The logical circuit 74 in FIG. 1 is a negative AND circuit which outputs the result of a negative AND (NAND) operation between the control signal X before the delay processing by the delay circuit 72 (that is, the control signal X just after the comparison circuit 50) and the control signal XD after the delay processing by the delay circuit 72. The inverting circuit 76 inverts the output signal of the logical circuit 74 to thereby generate the control signal Y1.

As shown in FIG. 2, in the case where the pulse width WX of the control pulse PX is larger than the delay amount δ (that is, the high load state), the control pulse PX is partially overlapped between the control signal X before the delay processing and the control signal XD after the delay processing. Thus, a control pulse PY1 having a pulse width corresponding to a section where the control pulse PX is overlapped between the control signal X and the control signal XD is generated in the control signal Y1.

On the other hand, like the first and second control pulses PX from the left side in FIG. 3, in the case where the pulse width WX is smaller than the delay amount δ (that is, the low load state), the control pulse PX is not overlapped between the control signal X before the delay processing and the control signal XD after the delay processing. Thus, the control pulse. PY1 corresponding to the control pulse PX having the pulse width WX smaller than the delay amount δ is not generated but only the control pulse PY1 corresponding to the control pulse PX having the pulse width WX larger than the delay amount δ is generated in the control signal Y1. That is, the short pulse removing circuit 70 acts as an element for removing the control pulse PX having the pulse width WX smaller than the delay amount δ in the control signal Y1.

The inverting circuit 78 in FIG. 1 inverts the control signal XD after the delay processing by the delay circuit 72 to thereby generate the control signal Y2. Thus, as shown in FIGS. 1 and 2, a control pulse PY2 having the opposite polarity (negative polarity) to that of each of the control pulses PX of the control signal XD is generated in the control signal Y2.

The driving circuit 80 in FIG. 1 includes a signal generation circuit 82, a signal generation circuit 84 and a comparison circuit 86. Each of the signal generation circuit 82 and the signal generation circuit 84 is configured by an RS (Reset-Set) flip-flop. The signal generation circuit 82 generates the driving signal DR1 and supplies from an output terminal /Q thereof to the gate of the transistor TR1, whilst the signal generation circuit 84 generates the driving signal DR2 and supplies from an output terminal Q thereof to the gate of the transistor TR2.

The input terminal S of the signal generation circuit 82 is supplied with the control signal Y1 from the short pulse removing circuit 70 (inverting circuit 76), whilst each of the input terminal R of the signal generation circuit 82 and the input terminal S of the signal generation circuit 84 is supplied with the control signal Y2 from the short pulse removing circuit 70 (inverting circuit 78). The input terminal R of the signal generation circuit 84 is supplied with a comparison signal SC from the comparison circuit 86. The comparison circuit 86 generates the control signal SC according to the voltage difference between the voltage VN at a connection point N (hereinafter called a "connection point voltage") between the transistor TR1 and the transistor TR2 and the ground voltage GND (zero). To be concrete, the comparison signal SC is set to a low level when the connection point voltage VN is lower than the ground voltage GND (VN<GND), whilst the comparison signal SC is set to a high level when the connection point voltage VN is equal to or higher than the ground voltage GND (VN≥GND).

In the above configuration, in the high load state where the pulse width WX of the control pulse PX exceeds the delay amount δ (WX>δ), as shown in FIG. 2, the control pulse PY1 corresponding to the overlapping between the control signal before the delay processing and the control signal after the delay processing is generated in the control signal Y1. Thus, a driving pulse PDR1 having a pulse width corresponding to a section from the front edge of the control pulse PY1 of the control signal Y1 to the rear edge of the control pulse PY2 immediately after the control signal Y2 (that is, a pulse width equal to that of the control pulse PX) is sequentially appeared in correspondence to each of the control pulses PX (WX>δ). The driving pulse PDR1 is a pulse of the negative polarity for turning the P-channel transistor TR1 on.

When the transistor TR1 is shifted into an ON state by being supplied with the driving pulse PDR1 explained above, as shown in FIG. 2, since the connection point N is coupled to the DC power source 12, the voltage VN of the connection point increases to the input voltage VIN. Thus, a current IL flowing into the choke coil L via the transistor TR1 from the DC power source 12 increases with the time.

In the aforesaid state, when the rear edge of the control pulse PY2 of the control signal Y2 arrives at the input terminal R of the signal generation circuit 82 and the input terminal S of the signal generation circuit 84, the supply of the driving pulse PDR1 to the transistor TR1 from the signal generation circuit 82 is terminated and the driving pulse PDR2 supplied to the transistor TR2 from the signal generation circuit 84 is set to a high level. That is, the transistor TR2 is shifted to an ON state simultaneously when the transistor TR1 is shifted to an OFF state.

Since the choke coil L acts to maintain the current IL just before the turning-off of the transistor TR1 at a stage immediately after the shifting to the off-state of this transistor, the current IL flowing through the transistor TR2 is continuously supplied to the choke coil L while this current reduces with time in a state that the connection point voltage VN is lower than the ground voltage GND (VN=VL). When the connection point voltage VN increases with time according to the reduction of the current IL and then reaches the ground voltage GND (IL=0), the comparison signal SC outputted from the comparison circuit 86 shifts to the high level. Thus, since the driving signal DR2 outputted from the output terminal Q of the signal generation circuit 84 shifts to the low level, the transistor TR2 shifts to the off state, whereby the connection point voltage VN changes to the output voltage VOUT. As described above, in the high load state, the current IL is repeatedly generated at every generation of the control pulse PX of the control signal X (control signal XD), whereby the output voltage VOUT is kept to a predetermined target value with a high accuracy.

On the other hand, when the pulse width WX of the control pulse PX is smaller than the delay amount δ (WX<δ), as shown in FIG. 3, the control pulse PY1 corresponding to the control pulse PX is not generated in the control signal Y1 (that is, the signal generation circuit 82 is not set). Thus, the driving pulse PDR1 corresponding to the control pulse PX is not generated in the driving signal DR1. As will be understood from the aforesaid explanation, the driving pulse generation circuit 60 according to the first embodiment generates the driving pulse PDR1 corresponding to the control pulse PX having the pulse width WX exceeding the delay amount δ and supplies this driving pulse to the transistor TR1, whilst stops generating the driving pulse PDR1 when the pulse width WX becomes smaller than the delay amount δ. Since the transistor TR1 does not shift to the ON state in the state where the generation of the driving pulse PDR1 is stopped, the current IL is not supplied to the choke coil L.

The output voltage VOUT reduces with time when the stopping state of the current IL continues as described above, whereby the pulse width WX becomes larger than the delay amount δ like the third control pulse PX from the left side in FIG. 3, for example. When the pulse width WX of the control pulse PX exceeds the delay amount δ, the driving pulse PDR1 is generated in the driving signal DR1 to thereby shift the transistor TR1 to the ON state. Thus, like the high load state, the current IL passed through the transistor TR1 is supplied to the choke coil L to thereby increase the output voltage VOUT. When the output voltage VOUT increases in response to the supply of the current IL, the pulse width WX of the control pulse PX becomes smaller than the delay amount δ, whereby the generation of the driving signal DR1 is stopped again.

That is, in the first embodiment, the frequency of the supply of the current IL to the chock coil L (increase of the output voltage VOUT) in the low load state reduces as compared with the high load state by a degree that the generation of the driving pulse PDR1 corresponding to the control pulse PX having the pulse width WX smaller than the delay amount δ is stopped in the low load state. Thus, an amount of the consumption power can be reduced as compared with the configuration where the current IL is generated at every control pulse PX also in the low load state as well as the high load state.

According to the first embodiment explained above, the output voltage VOUT can be kept to the target value with a high accuracy by generating the current IL at every control pulse PX of the control signal X in the high load state, whilst an amount of the consumption power can be reduced by stopping the generation of the driving pulse PDR1 in the low load state. Further, since the generation/stop of the driving pulse PDR1 is controlled according to the comparison between the predetermined value (delay amount δ) and the pulse width WX of the control signal X generated by the comparison between the detection voltage VD (output voltage VOUT) and the reference voltage VREF, the aforesaid respective effects can be realized while utilizing the common reference voltage VREF both in the high load state and the low load state. Thus, this embodiment is advantageous in that the circuit configuration can be simplified and the output voltage VOUT can be generated continuously as compared with the configuration where the circuit for the high load state and the circuit for the low load state are provided separately and one of these circuits is selectively utilized.

<B: Second Embodiment>

Figure 4:
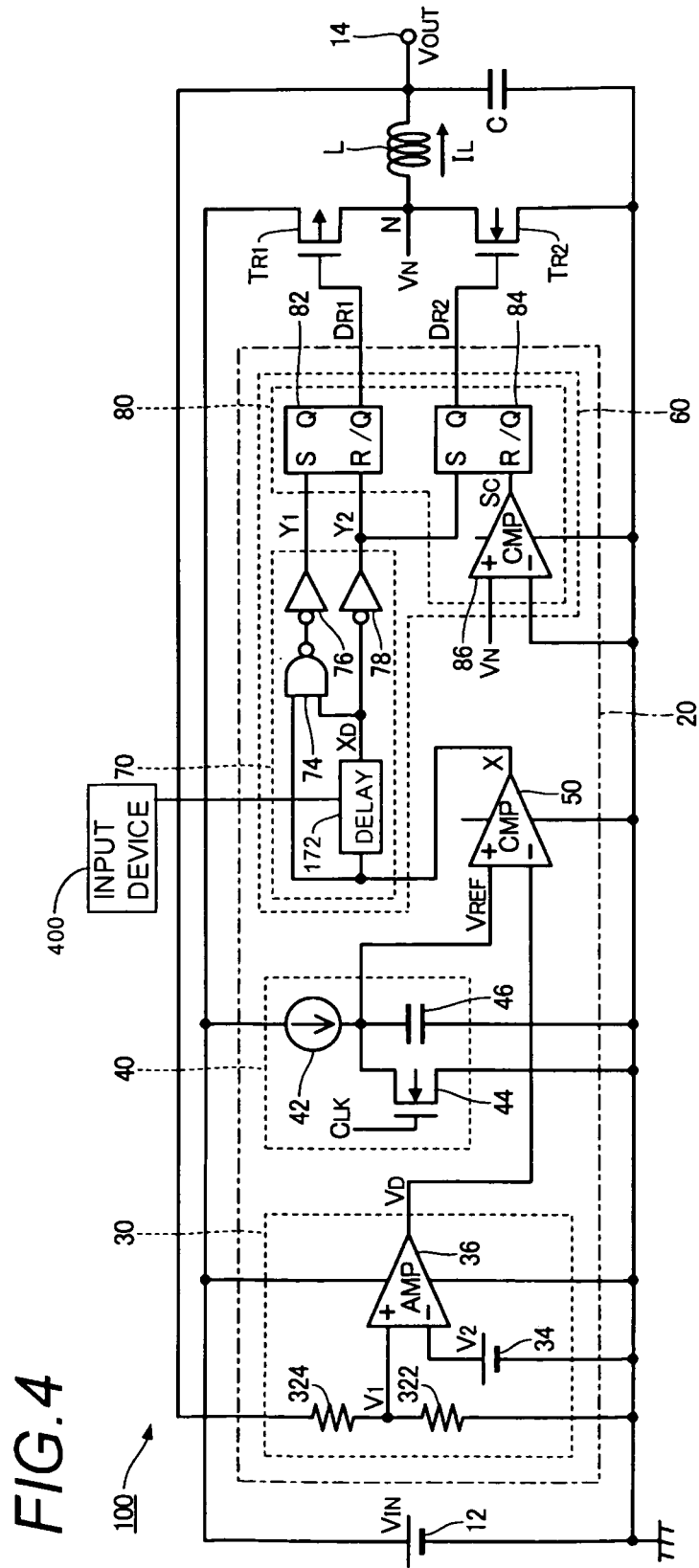
FIG. 4 is a block diagram showing a voltage generation circuit according to a second embodiment of the invention.

The second embodiment of the invention will be explained hereinafter. FIG. 4 is a block diagram showing a voltage generation circuit according to a second embodiment of the invention In FIG. 4, elements identical in actions and functions to those of the first embodiment are referred to by the common symbols, with detailed explanation thereof being omitted suitably.

The delay circuit 172 in the second embodiment is a variable delay circuit (a variable delay line, for example) capable of setting the delay amount δ to be applied to the control signal X so as to be variable. To be concrete, the delay amount δ may be set to be variable according to an instruction from an input device 400 operated by a user.

The number of the control pulses PX each having the pulse width WX smaller than the delay amount δ (that is, the control pulses PX neglected at the time of generating the driving pulses DR1) increases as the delay amount δ is increased. Thus, the effects of the reduction of a consumption amount in the low load state becomes remarkable in the large delay amount state as compared with the case where the delay amount δ is small. On the other hand, the number of the control pulses PX each having the pulse width WX smaller than the delay amount δ reduces as the delay amount δ is reduced. Thus, the effects of keeping the output voltage VOUT to the target value with a high accuracy becomes remarkable in the small delay amount state as compared with the case where the delay amount δ is large.

As explained above, according to the second embodiment, the number of the control pulses PX being reflected on the generation of the driving pulses PDR1 can be controlled so as to be variable according to the delay amount δ. Thus, the voltage generation performance (generation of the output voltage VOUT with a high accuracy/reduction of an amount of power consumption) can be set so as to be variable according to the usage of the voltage generation circuit 100, for example. For example, the delay amount δ is increased in the usage where the reduction of an amount of power consumption should have priority, whilst the delay amount δ is reduced in the usage where the generation of the output voltage VOUT with a high accuracy should have priority.

<C: Modified Example >

The aforesaid embodiments may be modified in various manners. The concrete modified examples will be explained below. Two or more of the following modified examples may be arbitrarily selected and combined suitably.

(1) Modified Example 1

In the above embodiments, the generation of the driving pulses PDR1 is stopped as to the control pulse having the pulse width WX smaller than the delay amount δ by performing the negative AND operation between the control signal X before the delay processing by the delay circuit 72 (172) and the control signal XD after the delay processing. However, the configuration of not reflecting the control pulse PX having the pulse width WX smaller than the predetermined width on the generation of the driving signal DR1 is not limited to the above configuration.

Figure 5:
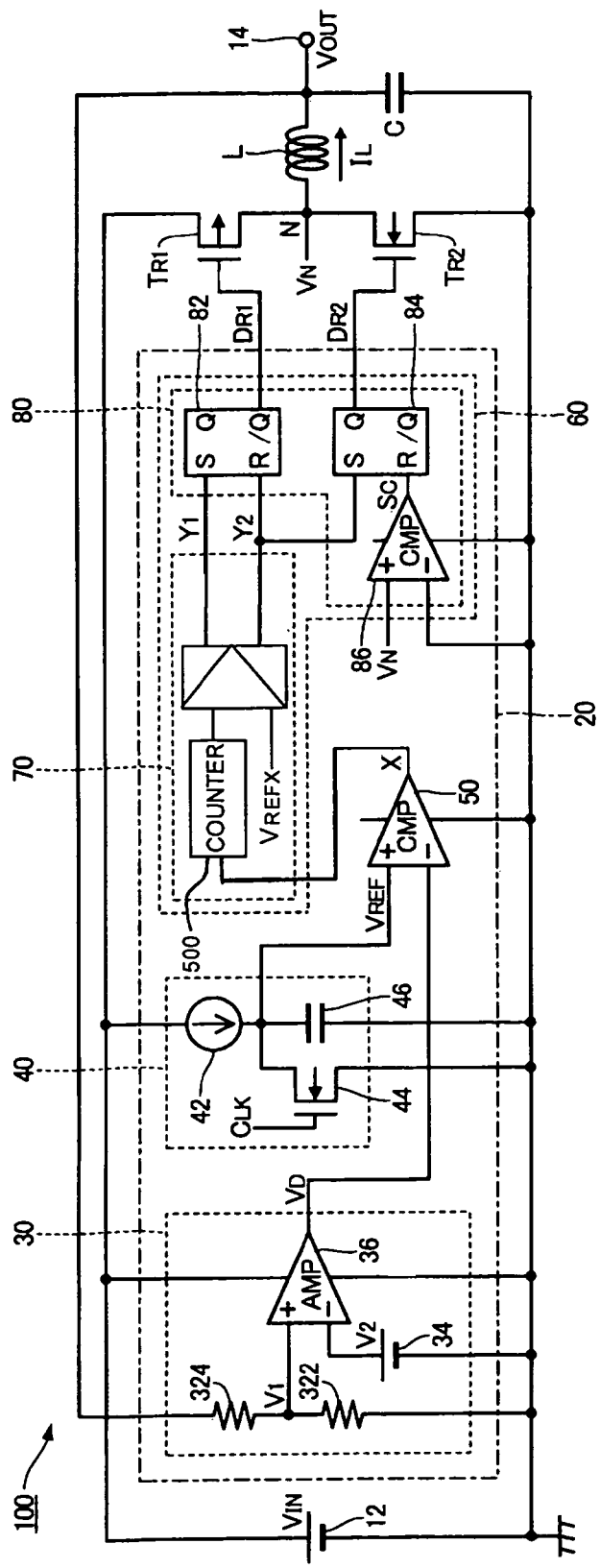
FIG. 5 is a block diagram showing a voltage generation circuit according to a modified example 1 of the invention.

FIG. 5 is a block diagram showing a voltage generation circuit according to a modified example 1 of the invention. In FIG. 5, a counting circuit (counter) 500 and a comparator is provided instead of the delay circuit 72 (172), the logical circuit 74, the inverting circuit 76, and the inverting circuit 78. For example, as shown in FIG. 5, it is possible to employ a configuration that the pulse width WX of the control pulse PX is measured by utilizing the counting circuit 500 to thereby determine whether or not the control pulse PX is to be reflected on the driving signal DR1 according to the comparison result between the measured value and a reference value VREFX.

According to the Modified Example 1, the number of the control pulses PX being reflected on the generation of the driving pulses PDR1 can be easily controlled so as to be variable according to a setting of the reference value VREFX to be compared with the pulse width WX of the control pulse PX measured by the counting circuit 500. Thus, the voltage generation performance (generation of the output voltage VOUT with a high accuracy/reduction of an amount of power consumption) can be set so as to be variable according to the usage of the voltage generation circuit 100 shown in FIG. 5.

However, according to the configuration of detecting the presence or non-presence of the overlapping between the control pulse PX before the delay processing by the delay circuit 72 and the control pulse after the delay processing like the aforesaid respective embodiments, the above respective embodiments have the advantage that the configuration of the driving pulse generation circuit 60 (short pulse removing circuit 70) can be simplified as compared with the configuration that the pulse width WX is measured by the counting circuit, for example.

(2) Modified Example 2

Figure 6:
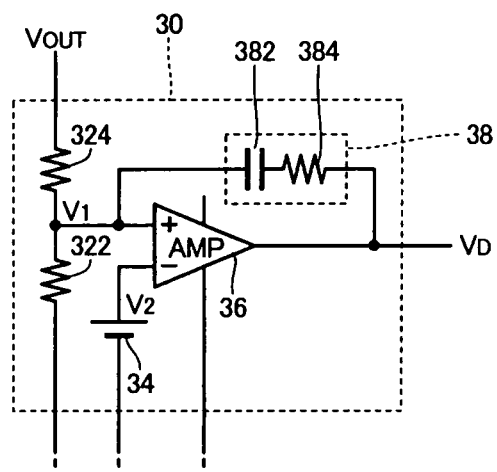
FIG. 6 is a circuit diagram of the voltage generation circuit in a modified example 2.

As shown in FIG. 6, it is possible to employ a configuration that a phase compensation circuit 38 for preventing the oscillation of the amplifier 36 to stably operate the amplifier is added to the voltage detection circuit 30 in each of the embodiments. The phase compensation circuit 38 shown in FIG. 6 is configured by a capacitor element 382 and a resistor element 384 connected in series between the non-inverting input terminal and the output terminal 14 of the amplifier 36. In the configuration where the circuit for a high load state and the circuit for a low load state are selectively utilized, the phase compensation circuit 38 shown in FIG. 6 is also required to be provided separately for the high load and the low load. However, according to the respective embodiments of the invention where the signal path is utilized commonly between the high load state and the low load state, the circuit for stabilizing the operation like the phase compensation circuit 38 shown in FIG. 6 can also be advantageously utilized commonly between the high load state and the low load state.

Here, the details of the above embodiments are summarized as follows. In the following explanation, although the elements of the embodiments corresponding to the elements of the invention are additionally described in parentheses in order to facilitate the understanding of the invention, this is not intended to limit the scope of the invention to the embodiments.

The voltage generation circuit according to the invention is a voltage generation circuit for generating an output voltage (an output voltage VOUT, for example) by supplying a driving pulse (a driving pulse PDR1, for example) to a transistor (a transistor TR1, for example) connected to a DC power source (a DC power source 12, for example) so as to be turned on, that comprises:

a voltage detection circuit (a voltage detection circuit 30, for example) that generates a detection voltage (a detection voltage VD, for example) according to the output voltage;

a reference voltage generation circuit (a reference generation circuit 40, for example) that generates a reference voltage (a reference voltage VREF, for example) which changes periodically;

a comparison circuit (a comparison circuit 50, for example) that generates a control signal (a control signal X, for example) according to a result of a comparison between the detection voltage and the reference voltage, wherein control pulses (control pulses PX, for example) each having a pulse width according to the detection voltage are sequentially appeared in the control signal; and a driving pulse generation circuit (a driving pulse generation circuit 60, for example) that generates a driving pulse corresponding to the control pulse and supplies the generated driving pulse to the transistor when the pulse width of the control pulse exceeds a predetermined width, and stops generating the driving pulse when the pulse width of the control pulse becomes smaller than the predetermined width.

According to the above configuration, the output voltage VOUT is kept to a target value with a high accuracy by generating the driving pulse at every control pulse of the control signal in the high load state, whilst an amount of the consumption power can be reduced by stopping the generation of the driving pulse in the low load state. In the control signal generated according to the comparison between the detection voltage and the reference voltage, since the generation of the driving pulse is stopped as to the control pulse which pulse width is smaller than the predetermined width, the respective effects can be realized while utilizing the common circuits and signals (the reference signal VREF, for example) between the high load state and the low load state. Thus, this invention has an advantage (the circuit configuration can be simplified, for example) that it is not necessary to employ the circuits and signals separately between the high load state and the low load state.

In a preferred aspect of the invention, the driving pulse generation circuit includes a delay circuit which delays the control signal, a logical circuit which outputs a result of a negative AND operation between the control signal before the delay processing and the control signal after the delay processing, and a driving circuit which generates the driving pulse according to an output signal of the logical circuit. According to the aforesaid aspect, the logical circuit outputs the result of the negative AND operation between the control signal before the delay processing and the control signal after the delay processing. Thus, in the output signal (control signal Y1, for example) of the logical circuit, pulses (control pulses PY1, for example) are generated each of which corresponds to the overlapping between the control signal (a control signal X, for example) before the delay processing and the control signal (a control signal XD, for example) after the delay processing. That is, the control pulse is reflected on the output signal of the logical circuit when the pulse width of the control pulse in the control signal exceeds the delay amount of the delay circuit, whilst the control pulse is not reflected on the output signal of the logical circuit when the pulse width of the control pulse in the control signal is smaller than the delay amount of the delay circuit. The driving circuit generates the driving pulse in which a front edge is defined according to the output signal of the logical circuit and a rear edge is defined according to the control signal after the delay processing by the delay circuit, for example. According to the above configuration, the length of the control pulse can be discriminated advantageously with a simple configuration utilizing the delay circuit.

In the aforesaid aspect utilizing the delay circuit for discriminating the pulse width of the control pulse, since the number of the control pulses (the control pulses reflected on the output signal of the logical circuit) used for the generation of the driving pulses reduces when the delay amount of the delay circuit is large, an amount of dissipation power necessary for generating the output voltage is reduced. On the other hand, since the number of the control pulses used for the generation of the driving pulses increases when the delay amount of the delay circuit is small, the output voltage can be set and kept to a predetermined target value with a high accuracy. Thus, according to the configuration where a delay amount of the delay circuit is set to be variable, either one of the generation of the output voltage with a high accuracy and the reduction of an amount of the dissipation power is set to have priority selectively according to the delay amount of the delay circuit.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2010-211703 filed on Sep. 22, 2010, the contents of which are incorporated herein by reference.

100 voltage generation circuit
12 DC power source
14 output terminal
TR1, TR2 transistor
L choke coil
C smoothing capacitor
20 control circuit
30 voltage detection circuit
322, 324 resistor element
34 voltage source
36 amplifier
38 phase compensation circuit
40 reference generation circuit
42 current source circuit
44 transistor
46 capacitor element
50 comparison circuit
60 driving pulse generation circuit
70 short pulse removing circuit
72 delay circuit
74 logical circuit
76, 78 inverting circuit
80 driving circuit
82, 84 signal generation circuit
86 comparison circuit

What is claimed is:

1. A voltage generation circuit for generating an output voltage by supplying a driving pulse to a transistor connected to a DC power source so as to be turned on, comprising:

a voltage detecting circuit that generates a detection voltage according to the output voltage;

a reference voltage generation circuit that generates a reference voltage which changes periodically;

a comparison circuit that generates a control signal according to a result of a comparison between the detection voltage and the reference voltage, wherein control pulses each having a pulse width according to the detection voltage sequentially appear in the control signal; and a driving pulse generation circuit that generates the driving pulse corresponding to the control pulse and supplies the generated driving pulse to the transistor when the pulse width of the control exceeds a predetermined width, and stops generating the driving pulse when the pulse width of the control pulse becomes smaller than the predetermined width.

2. The voltage generation circuit according to claim 1, wherein the driving pulse generation circuit includes:

a delay circuit which delays the control signal;

a logical circuit which outputs as an output signal, a result of a negative AND operation between the control signal before the delay and the control signal after the delay; and a driving circuit which generates the driving pulse according to the output signal of the logical circuit.

3. The voltage generation circuit according to claim 2, wherein the driving circuit generates the driving pulse in which a front edge is defined according to the output signal of the logical circuit and a rear edge is defined according to the control signal after the delay by the delay circuit.

4. The voltage generation circuit according to claim 2, wherein a delay amount of the delay circuit is variable.

5. The voltage generation circuit according to claim 1, wherein the driving pulse generation circuit includes:

a counting circuit which measures the pulse width of the control pulse;

a comparator which generates an output signal according to a result of a comparison between the pulse width measured by the counting circuit and a reference value; and a driving circuit which generates the driving pulse according to the output signal output from the comparator.

* * * * *